United States Patent
Yoneda (10) Patent No.: US 7,380,056 B2
(45) Date of Patent: May 27, 2008

(54) DATA RECORDING APPARATUS, INITIALIZATION METHOD OF RECORDING MEDIUM, AND STORAGE MEDIUM

(75) Inventor: Shigeru Yoneda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 11/264,644

(22) Filed: Nov. 1, 2005

(65) Prior Publication Data

US 2006/0109751 A1 May 25, 2006

(30) Foreign Application Priority Data

Nov. 25, 2004 (JP) .............................. 2004-339819

(51) Int. Cl.
*G06F 13/00* (2006.01)
(52) U.S. Cl. ...................... 711/112; 711/170
(58) Field of Classification Search ..................... None
See application file for complete search history.

(56) References Cited

U.S. PATENT DOCUMENTS

| 6,718,319 B1* | 4/2004 | Fisher et al. ................... 707/1 |
| 6,889,249 B2* | 5/2005 | Miloushev et al. ......... 709/213 |
| 7,089,271 B1* | 8/2006 | Kihara et al. ............... 707/205 |
| 2005/0080985 A1* | 4/2005 | Sasaki ........................ 711/103 |

* cited by examiner

*Primary Examiner*—Than Nguyen
(74) *Attorney, Agent, or Firm*—Cowan, Liebowitz & Latman, P.C.

(57) ABSTRACT

Initialization information including the number of areas to be produced on a recording medium, the capacities of the respective areas, and the types of the formats is produced. The recording medium is initialized in accordance with the initialization information. The initialization information is saved after the initialization processing. The saved preceding initialization information is exhibited to a user as one of the choices of initialization methods at the time of the next initialization of the recording medium.

5 Claims, 6 Drawing Sheets

DATA RECORDING APPARATUS, INITIALIZATION METHOD OF RECORDING MEDIUM, AND STORAGE MEDIUM

BACKGROUND OF THE INVENTION

1. Field of the Invention

The present invention relates to an initialization technique of a recording medium for recording data.

2. Description of Related Art

The enlargement of the capacity of a detachable recoding medium such as a memory card used for a digital camera and the like has been progressing. It can be considered that a situation in which not all of the recording capacity of a memory card can be used by the format of File Allocation Table (FAT) 12 or FAT 16, which are generally used now, is brought about. However, in case of performing the formatting using a system capable of dealing with a large capacity such as FAT 32 to deal with the whole recording capacity of a recoding medium, it is considerable that such a format cannot be used by an existing digital camera.

Accordingly, the methods enabling the use of the whole recording capacity of a recoding medium while ensuring the compatibility with the existing digital camera have been examined. As one of them, there is a method in which one medium is divided into a plurality of partitions and each partition is formatted into a format different from one another, as generally performed to a hard disk built in a personal computer or the like. For example, the leading partition is formatted by FAT 12 or FAT 16, which can be recognized by the existing digital camera, and the other partitions are formatted by a file system capable of dealing with a large capacity like FAT 32.

However, a problem is caused in the case where a detachable recording medium is divided into a plurality of partitions to produce a plurality of types of formats in a mixed state. That is, when a general user initializes a recording medium, a situation is expected in which it takes some time for the user to designate the recording capacity and the formatting type of each partition and operations become more complicated in comparison with those of a conventional simple initialization method.

SUMMARY OF THE INVENTION

The present invention is for solving the problem mentioned above. It is an object of the invention to provide a data recording apparatus, an initialization method of a recording medium, and a recording medium, all improving the operationality of a user in initialization by using saved initialization information.

As means for achieving such an object, a data recording apparatus of the present invention includes:

an information producing device producing initialization information including a number of areas to be produced on a recording medium, and capacities and types of formats of the respective areas;

an initialization device initializing the recording medium in accordance with the initialization information;

a save device saving the initialization information after initialization processing by the initialization device; and an exhibition device exhibiting preceding initialization information saved in the save device as one of choices of initialization methods at a next initialization of the recording medium.

Moreover, it is another object of the present invention to provide a data recording apparatus, an initialization method of a recording medium, and a recording medium, all improving the operationality of a user in initialization by using the information on the number of areas of the recording medium.

As means for achieving such an object, data recording apparatus of the present invention includes:

an analysis device analyzing a number of areas of a recording medium; and an exhibition device exhibiting a method of making the number of the areas to be one, to a user as an initial value of an initialization method at the time of initialization of the recording medium in a case where it is analyzed by the analysis device that a plurality of the areas of the recording medium exists.

BRIEF DESCRIPTION OF THE DRAWINGS

The above objects of the present invention will become more apparent from the following drawings and the detailed descriptions based on the drawings, in which.

DETAILED DESCRIPTION OF THE PREFERRED EMBODIMENTS

In the following, the preferred embodiment of the present invention is described with reference to the attached drawings.

Figure 1:
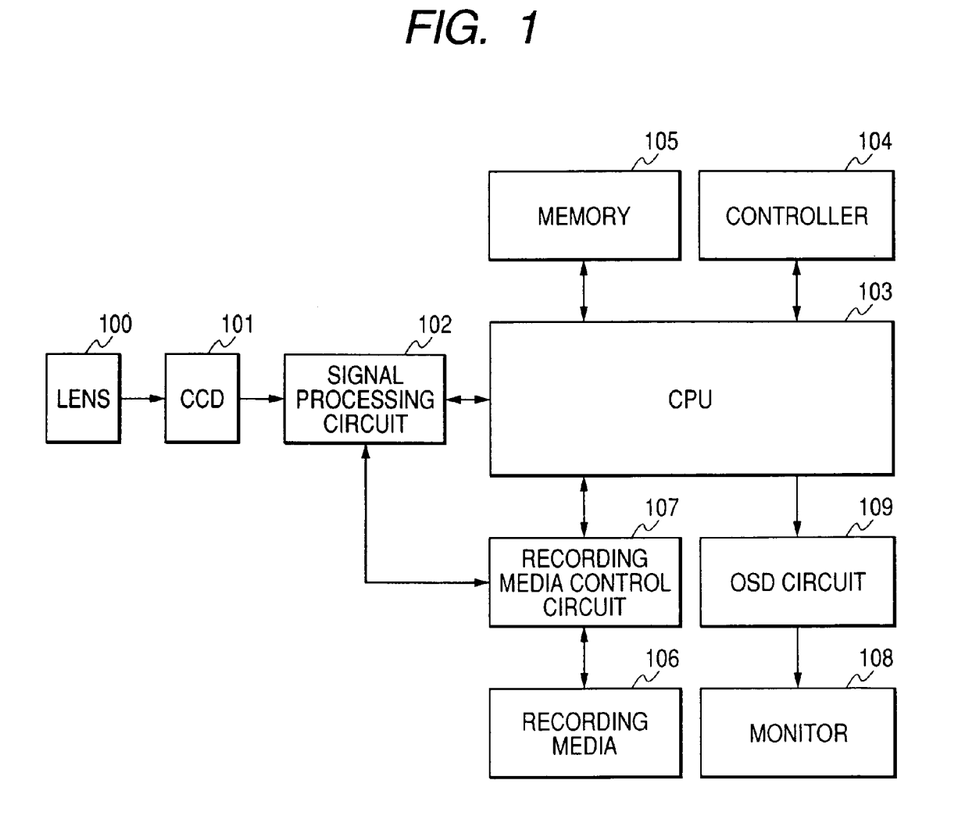
FIG. 1 is a diagram showing a schematic configuration of a digital camera to which the present invention is applied.

FIG. 1 is a block diagram showing a schematic configuration of a digital camera to which the present invention can be applied.

A reference numeral 100 denotes a lens. A reference numeral 101 denotes a CCD image pickup device converting an image which has entered via the lens 100, into an electric signal. A reference numeral 102 denotes a signal processing circuit converting a signal obtained by the CCD image pickup device 101 into desired image data.

A reference numeral 103 denotes a CPU controlling the whole system. A reference numeral 104 denotes a controller for inputting an operation command into the CPU 103, and the controller 104 is equipped with a four-way operational key, a decision button and the like for user to operate the digital camera.

A reference numeral 105 denotes a memory. The memory 105 is equipped with a nonvolatile memory recording an initialization configuration which the user selects.

A reference numeral 106 denotes a detachable recoding medium. As the recoding medium, for example, a Secured Digital (SD) card, a Compact Flash (CF; registered trademark) card and the like can be cited. But, the present invention is not restricted to these recoding media. A reference numeral 107 denotes a recoding medium control circuit. The recoding medium control circuit 107 controls a communication protocol with the recoding medium 106. The recoding medium control circuit 107 accesses the recoding medium 106 and performs the reading and the writing of data under the control from the CPU 103.

A reference numeral 108 denotes a monitor. A reference numeral 109 denotes an on screen display (OSD) circuit. The OSD circuit 109 displays a menu using characters or pictures, and the like on the monitor 108 in accordance with the control from the CPU 103. The monitor 108 provides a user interface together with the controller 104.

Figure 2:
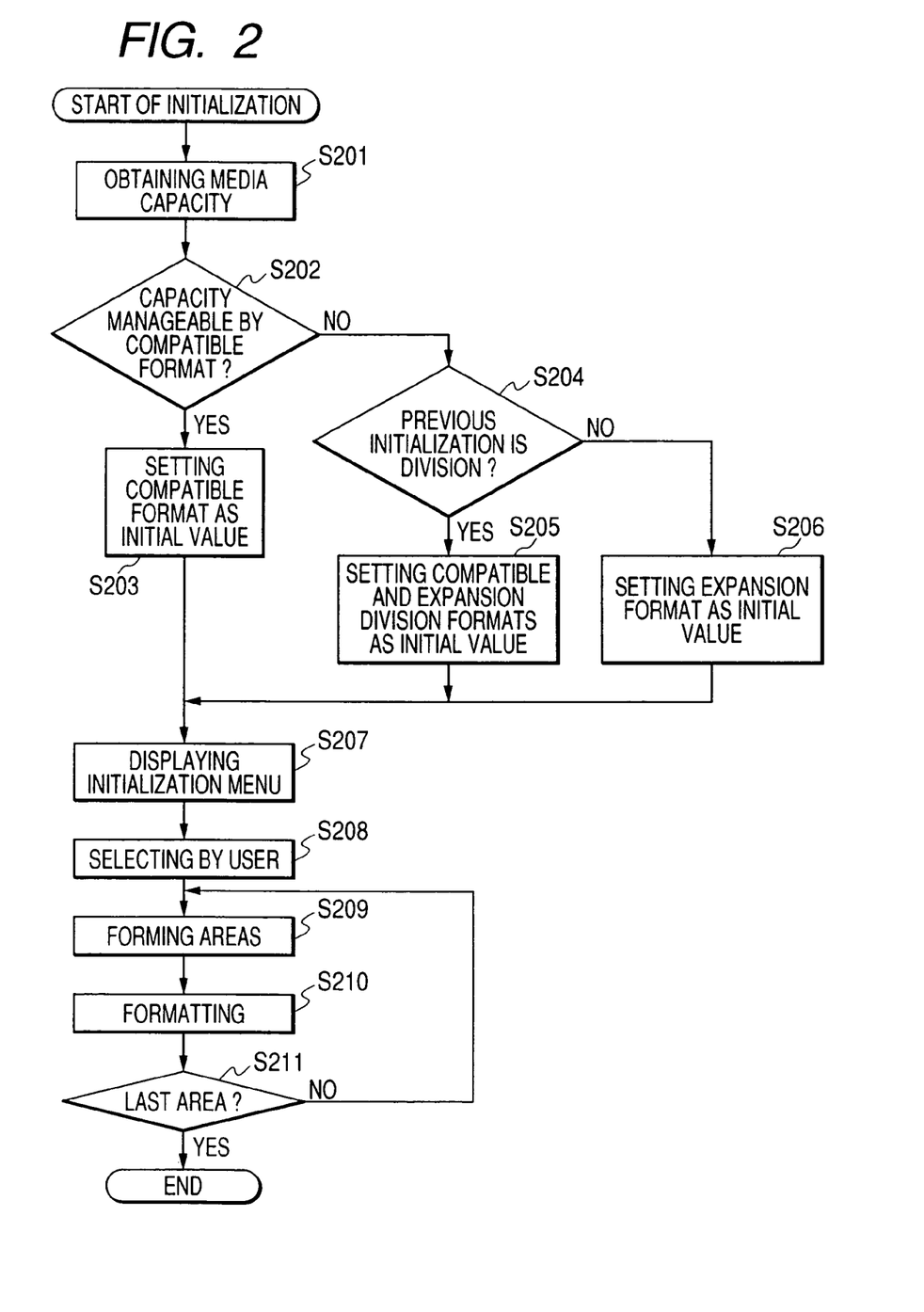
FIG. 2 is a flowchart showing a processing operation at the time of initializing a recoding medium.

FIG. 2 is a flowchart showing a processing operation in the CPU 103 at the time of initializing the recoding medium 106.

When the CPU 103 receives an operation by a user from controller 104, the CPU 103 starts the initialization processing of the recoding medium 106, and controls the recoding medium control circuit 107 to obtain the recoding capacity of the recoding medium 106 (Step S201).

Next, the CPU 103 judges whether the recoding capacity obtained at Step S201 is a recoding capacity manageable in a format compatible with an existing digital camera such as FAT 12 or FAT 16 (Step S202).

In the case where the CPU 103 has judged that the storage capacity is manageable only in the compatible format at Step S202, the CPU 103 sets the configuration in which the number of partitions is made to be one, and initialization using only the compatible format is set as the initial value of the choice to be exhibited to the user (Step S203). In this case, as the name of the choice to be exhibited to the user, the name of "FAT 16" may be used as it is, but by avoiding such a technical term, a name indicating an abstracted use such as a "compatible format" may be used.

On the other hand, in the case where, at Step S202, the CPU 103 has judged that the recording capacity of the recoding medium 106 exceeds the recording capacity manageable in the format compatible with the existing digital camera such as FAT 12 or FAT 16, the processing operation of the CPU 103 proceeds to Step S204. Then, the CPU 103 judges whether the preceding initialization configuration has been divided into partitions or not based on the preceding initialization configuration information saved in the memory 105 (Step S204). At Step S204, in the case where, the CPU 103 performs the initialization for the first time, no preceding initialization configuration is saved in the memory 105. In that case, the CPU 103 may perform the judgment by, for example, using an initialization configuration performing formatting by using only an expansion format such as FAT 32, which can deal with a large capacity, without dividing the recording capacitance of the recording medium 106 into partitions, as a provisional preceding initialization configuration.

In the case where the CPU 103 has judged at Step S204 that the preceding initialization configuration is one having performed the partition division, the CPU 103 sets the configuration in which a compatible format and an expansion format are mixed as the initial value on the basis of the preceding initialization configuration information saved in the memory 105 (Step S205). In such the configuration, a first partition is initialized in accordance with FAT 16 by securing the maximum recording capacity which FAT 16 can manage, and the residual partitions are initialized in accordance with FAT 32.

Moreover, in the case where the CPU 103 has judged at Step S204 that the preceding initialization configuration is one not having performed partition division, the CPU 103 sets the configuration in which the whole recording medium 106 is initialized in accordance with an expansion format such as FAT 32, as the initial value (Step S206).

After the initial values of the choices of the initialization methods to be exhibited to the user have been determined through Step S203, S205 or S206, the CPU 103 adds as the other choice, a choice of freely dividing the area to the determined initial values, and controls the OSD circuit 109 to display a menu of the initialization methods on the monitor 108 (Step S207).

After the user has selected an initialization method in the menu (Step S208), the CPU 103 produces partitions to have the designated recording capacities in order from the leading (Step S209), and the CPU 103 formats the recording medium 106 in accordance with the designated types (Step S210). After that, the CPU 103 judges whether the formatting processing has been executed until the set last partition or not (Step S211). In the case where the formatting processing has not been completed, the processing operation returns to Step S209 to produce partitions to have designated recording capacity, and then formatting is performed at Step S210. This processing is repeated.

Figure 3:
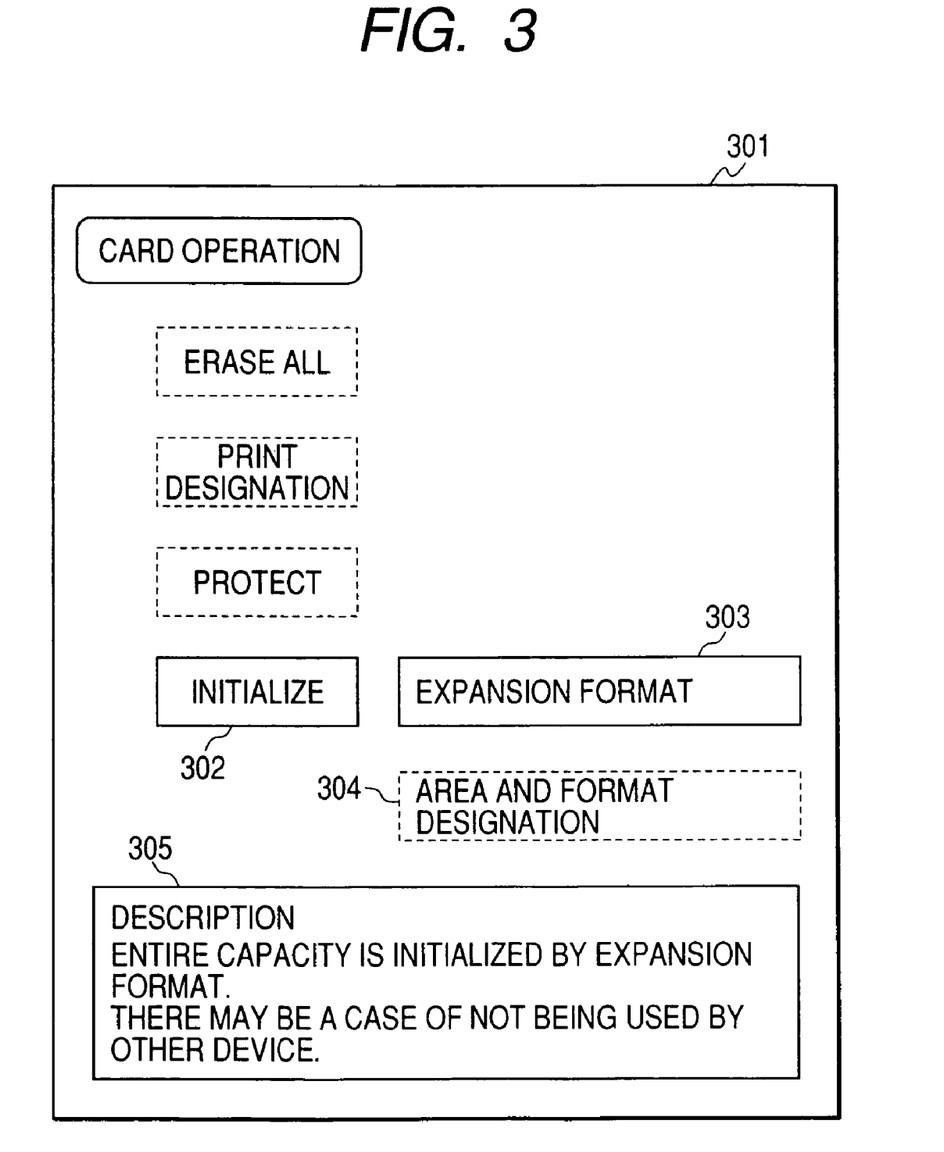
FIG. 3 is a view showing an example of an initialization method selection screen in the case where initialization is selected on a card operation selection screen.

FIG. 3 shows the state in which the OSD circuit 109 displays a card operation menu 301 on the monitor 108.

When the user operates a card operation menu button or the like with the controller 104, the card operation menu 301 is displayed. When the user selects an initialization item 302 with an upper and lower side key equipped in the controller 104, the CPU 103 makes the operation processing proceed to Step S207 of FIG. 2, and the processing operation enters a state of displaying the initialization menu. FIG. 3 shows a situation after the processing operation proceeded to the Step 207 via Step S206 of FIG. 2. An expansion format item 303 is set as the initial selection state, and two choices of the expansion format item 303 and an area and format designation item 304 are displayed.

Moreover, in the menu in which items are displayed to be selected as shown in FIG. 3, it is also possible to display a description of the item which the user has selected, by providing a description column 305. Here, when the expansion format item 303 is selected, all capacities are initialized as one area by the expansion format.

In addition, when the initialization is performed, it is also considerable that the processing operation of the CPU 103 once moves to an initialization confirmation screen to require a confirmation of the user again.

Figure 4:
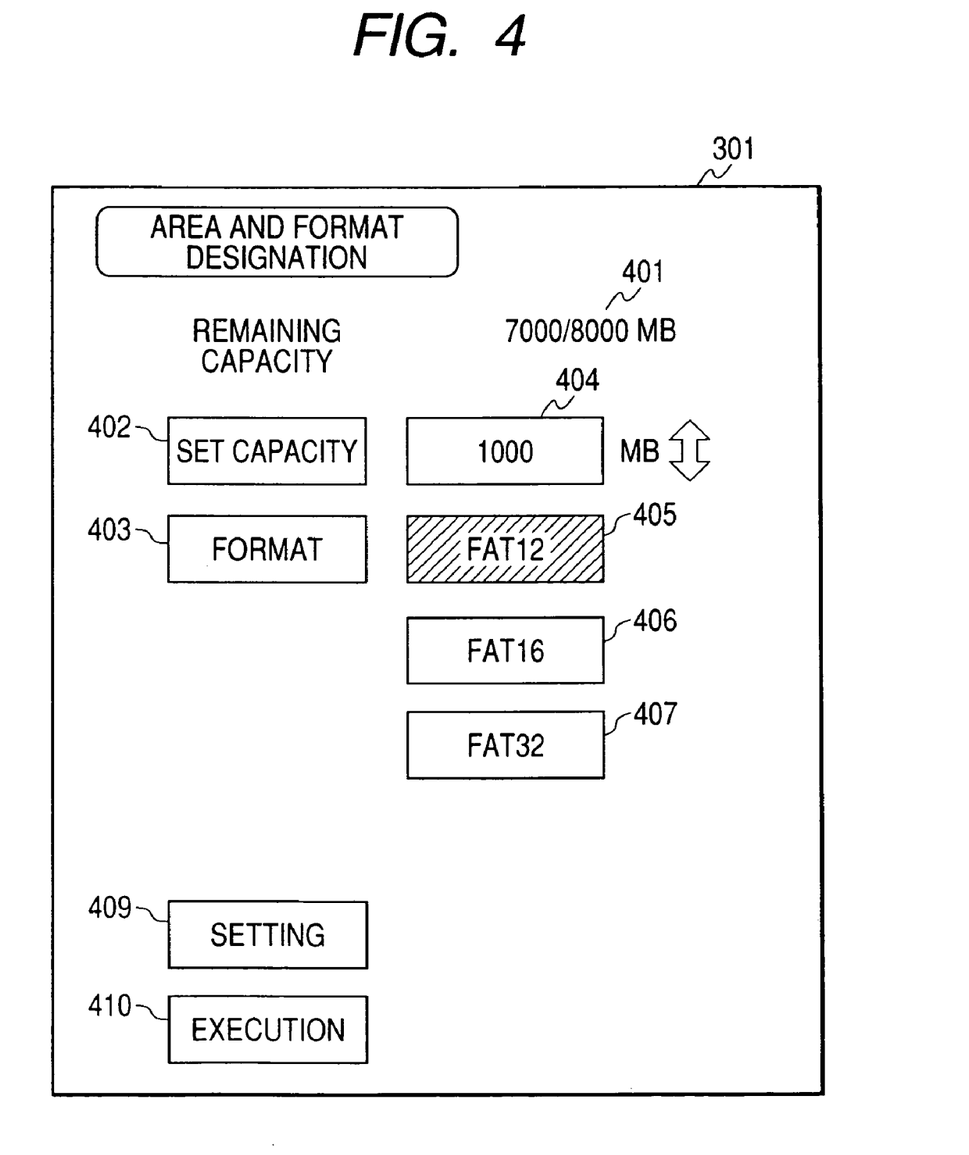
FIG. 4 is a view showing an example of a designation screen in the case where area and format designation is selected on the initialization method selection screen.

FIG. 4 is a screen for designating the number of areas, and the capacities and the formats of the areas. In FIG. 3, when the user selects the initialization item 302 and the area and format designation item 304, the display of the monitor 108 changes to the screen shown in FIG. 4. That is, the user interface which makes it possible to designate a more detailed recording medium initialization method is displayed.

Here, a set capacity item 402 is first selected. When the user operates the controller 104 to the right-hand side in this state, a capacity setting item 404 is selected. By varying the numerical value by vertical operations in this state, the user can designate the size (recoding capacity) of a partition to be produced.

Next, the designation returns to the set capacity item 402 from the position of the capacity setting item 404 by a left-hand side operation, and a format item 403 is selected by a further lower direction operation. From this state, the designation moves to an item 405 showing FAT 12 by a right-hand side operation, and the other items 406 to 407 can be selected by vertical operations.

Moreover, when a format system is selected, it is also possible to display an unselectable item with being differently colored to indicate the unselectable state, according to the value of the capacity setting item 404 as the item 405 in FIG. 4. Moreover, the position of the unselectable item may be set so as not to be selected by upper and lower operations.

After setting the recording capacity and the format system of the partition to be intended to be produced, a setting item 409 is selected by the similar directional operations. Then, when a decision operation is performed, an area is set. A residual capacity, which is not yet set to the total capacity, is calculated again, and displayed in the column 401 showing the residual capacity, thereby changing the display of the column 401.

Also the recording capacity and the formatting type of the next partition are selected by a similar procedure, and the setting can be repeatedly performed for the number of desired partitions until the residual capacities run out. At the stage at which the setting of each area has all been completed, when the user selects an execution item 410 and performs a decision operation, the recording medium 106 is actually initialized in accordance with the set information.

Figure 5:
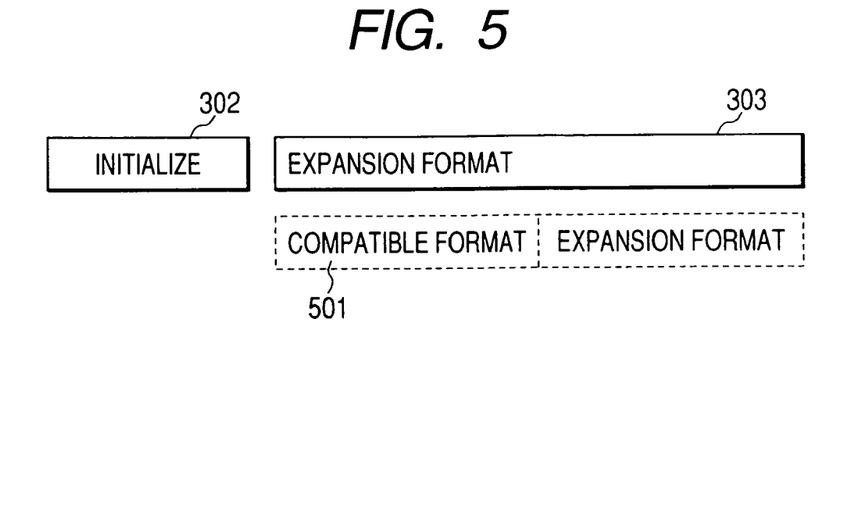
FIG. 5 is a view showing another example of the initialization method selection screen in the case where the initialization is selected on the card operation selection screen.

FIG. 5 shows another example of the choices displayed in the case where the initialization item 302 is selected in FIG. 3. A compatible format/expansion format item 501 is displayed in place of the area and format designation item 304 in FIG. 3. In the case where the compatible format/expansion format item 501 is selected, the area is divided into two pieces, and the first half of the two pieces is made to the maximum area manageable in a compatible format, and all of the residual areas are made to be an expansion format. In such a way, it is also possible to set a fixed initialization configuration as a choice in place of letting a user set freely.

Figure 6:
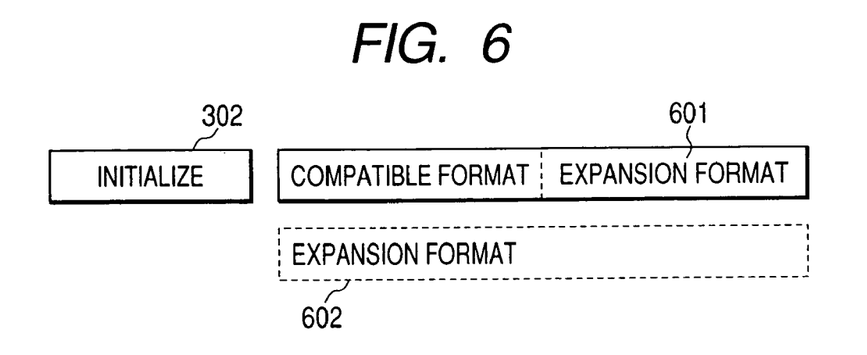
FIG. 6 is a view showing a further example of the initialization method selection screen in the case where the initialization is selected on the card operation selection screen.

FIG. 6 shows another example of the choices displayed in the case of passing Step S205 in FIG. 2. Here, a state in which a compatible format/expansion format 601 is selected as an initial choice is shown. As another choice, an expansion format item 602 is exhibited. Also in FIG. 6, it is considerable that a method of exhibiting the area and format designation item 304 freely designating an area and a format is adopted as shown in FIG. 3.

Figure 7:
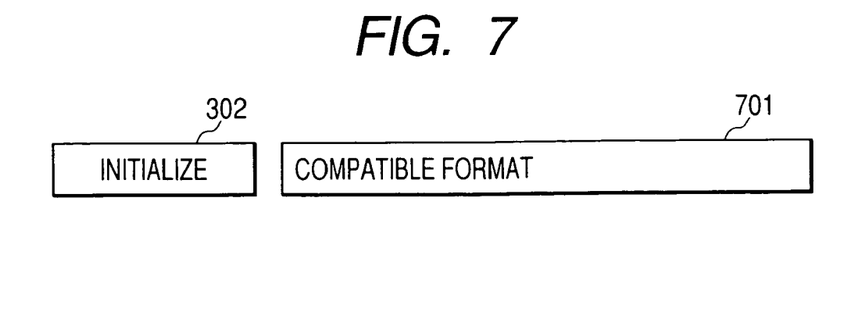
FIG. 7 is a view showing a still further example of the initialization method selection screen in the case where the initialization is selected on the card operation selection screen.

FIG. 7 shows another example of the choices displayed in the case the operation processing proceeds via Step S203 in FIG. 2. Here, because the recoding capacity of the recoding medium 106 is equal to the capacity manageable only in a compatible format or less, only a compatible format item 701 is exhibited. When the compatible format item 701 is selected by an operation of a user, initialization processing is performed.

Also in FIG. 7, it is also considerable to adopt a method of exhibiting the area and format designation item 304 enabling a free designation of the number of areas and their formats as shown in FIG. 3. Moreover, because only one choice exists which is exhibited when the initialization item 302 is selected in this example, it is also possible to perform initialization processing directly without exhibiting the compatible format item 701 when the initialization item 302 is selected.

Figure 8:
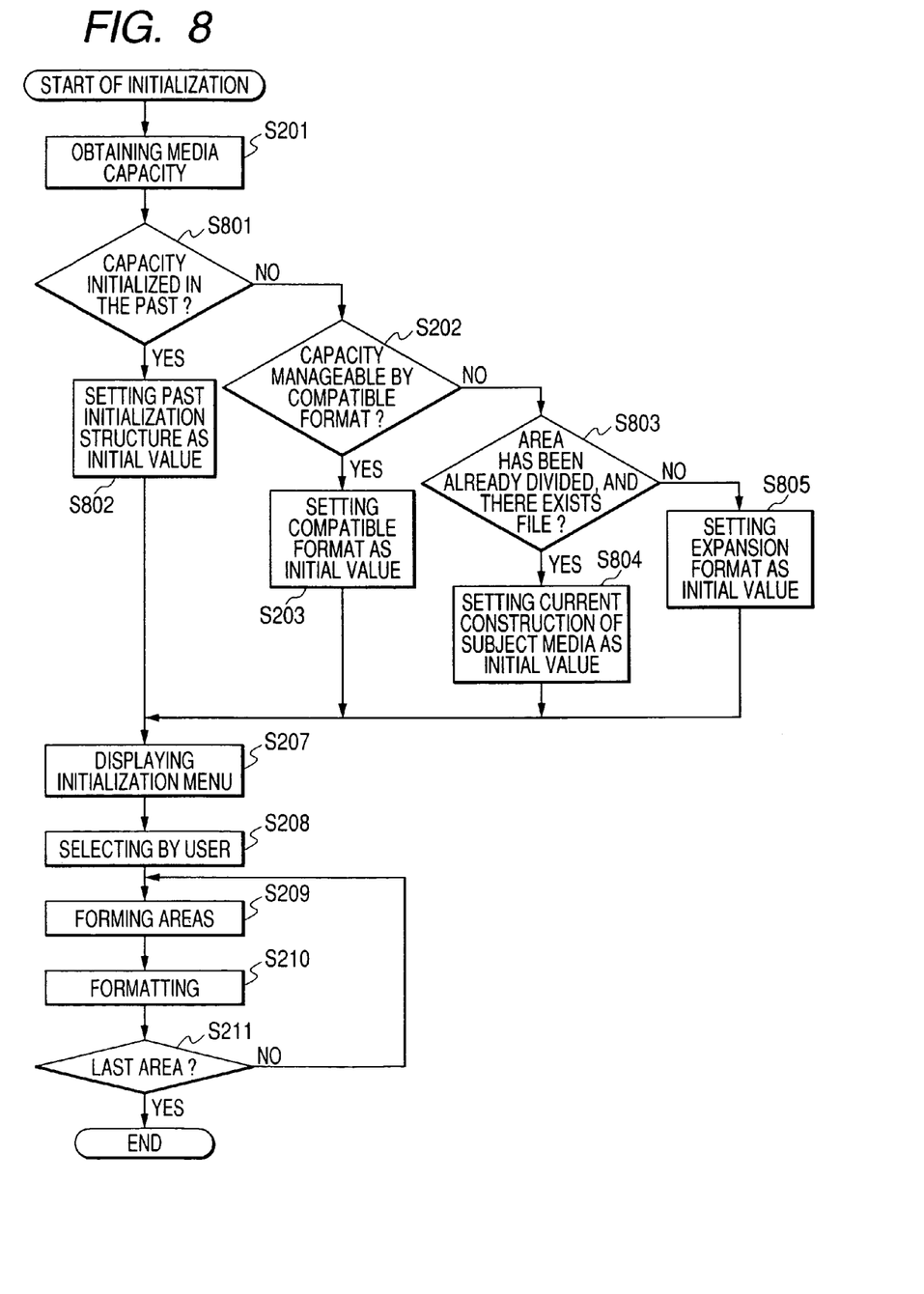
FIG. 8 is a flowchart showing another processing operation at the time of initializing the recoding medium.

FIG. 8 is a flowchart showing another processing operation performed by the CPU 103 at the time of initializing the recoding medium 106.

First, the CPU 103 obtains the recording capacity of a medium at Step S201 similar to that in FIG. 2. After that, the CPU 103 retrieves, from the memory 105 the capacity of the recording medium which has been initialized in the past, and the configuration information of the number of divided areas, the capacities and the formats of the respective areas at the time of the initialization of the recording medium. Then, the CPU 103 judges whether the medium is the one which has been initialized in the past or not (Step S801).

In the case where the CPU 103 judges at Step 801 that the medium is the one which has been initialized in the past, the CPU 103 determines the number of the divided areas, the configurations of the capacities and the formats of the respective areas at the time of the initialization as the initial values of the initialization processing of the recording medium (Step S802).

Moreover, in the case where the CPU 103 judges at Step S801 that the medium is the one which has not been initialized in the past, the CPU 103 judges whether the medium has a capacity manageable in the compatible format or not by the processing similar to that at Step S202 in FIG. 2.

In the case where the medium has the capacity equal to the one manageable in the compatible format or larger, the CPU 103 judges whether the recording medium 106 which is intended to be initialized has been once subjected to the initialization of area division or not, and also detects whether any file exists in any area or not (Step S803). In the case where the CPU 103 detects the area division and the existences of the file at Step S803, the CPU 103 determines the choice of performing the initialization with the current configuration of the medium as the initial value (Step S804). In the case where the CPU 103 does not detect the area division and the existences of the file at Step S803, the CPU 103 determines a configuration for making the areas to one to manage the medium only by the expansion format as the initial value (Step S805).

After that, the CPU 103 exhibits the initialization menu to the user at Step S207 similar to that in FIG. 2.

In the case where a large capacity recording medium is initialized for the first time, by performing the processing in accordance with such a flow, it is possible to recommend the expansion format. At the same time, in the case where the user has once initialized the medium by another configuration, it is also possible to exhibit the initialization menu which sets the configuration as the initial value after the initialization of the user by the other configuration.

Incidentally, it is needless to say that the object of the present invention can be achieved by providing a storage medium recording the program codes of the software realizing the functions of the embodiment mentioned above to a system or an apparatus, and by making the computer (or the CPU or the MPU) of the system or the apparatus read and execute the program codes stored in the medium.

In this case, the program codes read from the storage medium themselves realize the functions of the embodiment mentioned above, and the program codes themselves and the storage medium storing the program codes constitute the present invention.

As the storage medium for providing the program codes, there can be used, for example, a flexible disk, a hard disk, an optical disk, a magneto-optical disk, a CD-ROM, a CD-R, a magnetic tape, a nonvolatile recording medium, a ROM and the like.

Moreover, it is needless to say that the present invention includes not only the case where the functions of the embodiment mentioned above are realized by executing the program codes read by the computer, but also the case where the OS (a basic system or an operating system) which is working on a computer performs a part or all of the actual processing and the functions of the embodiment mentioned above are realized by the processing of the OS or the like.

Moreover, it is needless to say that the present invention includes the case where, after the program codes read from a storage medium have been written in a memory installed in a function enhancement board inserted into a computer or a function enhancement unit connected to the computer, the CPU or the like installed in the function enhancement board or the function enhancement unit executes a part or the whole actual processing and the functions of the embodiment mentioned above are realized by the processing.

Although the present invention has been described using the preferable embodiment in the above, the present invention is not limited to the embodiment mentioned above, but various modifications can be performed in a range shown by Claims.

This application claims priority from Japanese Patent Application No. 2004-339819 filed Nov. 25, 2004, which is hereby incorporated by reference herein.

What is claimed is:

1. A data recording apparatus comprising:
    an information producing device producing initialization information including a number of areas to be produced on a recording medium, and capacities and kinds of formats of the respective areas;
    an initialization device initializing said recording medium in accordance with the initialization information;
    a save device saving the capacity of said recording medium and the initialization information used at the time of the initialization processing by said initialization device as the combination thereof after initialization processing by said initialization device;
    a capacity detection device detecting a capacity of said recording medium; and
    an exhibition device exhibiting preceding initialization information saved in said save device as one of choices of initialization methods at a next initialization of said recording medium,
    wherein said exhibition device obtains the initialization information corresponding to the capacity of said recording medium to be initialized from said save device to exhibit the user the obtained initialization information as one of the choices of said initialization methods at the next initialization of said recording medium.

2. The data recording apparatus according to claim 1, wherein said recording medium is a detachable recording medium.

3. The data recording apparatus according to claim 2, further comprising:
    a medium detection device detecting installing of said recording medium,
    wherein said exhibition device exhibits a preceding initialization configuration stored in said save device as a candidate of said initialization methods to the user when installing of said recording medium is detected.

4. An initialization method of a recording medium, comprising:
    an information producing step of producing initialization information including a number of areas to be produced on said recording medium, and capacities and types of formats of the respective areas;
    an initialization step of initializing said recording medium in accordance with the initialization information;
    a save step of saving the capacity of said recording medium and the initialization information used at the time of the initialization processing by said initialization device as the combination thereof after initialization processing in said initialization step;
    a capacity detection step of detecting a capacity of said recording medium; and
    an exhibition step of exhibiting preceding initialization information saved at said save step as one of choices of initialization methods at a next initialization of said recording medium,
    wherein said exhibition step includes a step of obtaining the initialization information corresponding to the capacity of said recording medium to be initialized from said save device to exhibit the user the obtained initialization information as one of the choices of said initialization methods at the next initialization of said recording medium.

5. A storage medium computer-readably storing a program for executing an initialization method of a recording medium, said method comprising:
    an information producing step of producing initialization information including a number of areas to be produced on said recording medium, capacities and types of formats of the respective areas;
    an initialization step of initializing said recording medium in accordance with the initialization information;
    a save step of saving the capacity of said recording medium and the initialization information used at the time of the initialization processing by said initialization device as the combination thereof after initialization processing in said initialization step;
    a capacity detection step of detecting a capacity of said recording medium; and
    an exhibition step of exhibiting preceding initialization information saved at said save step as one of choices of initialization methods at a next initialization of said recording medium,
    wherein said exhibition step includes a step of obtaining the initialization information corresponding to the capacity of said recording medium to be initialized from said save device to exhibit the user the obtained initialization information as one of the choices of said initialization methods at the next initialization of said recording medium.

* * * * *